Sept. 24, 1957 — R. C. VAUGHAN — 2,807,447
FOOD MIXER
Filed Nov. 9, 1954 — 3 Sheets-Sheet 1
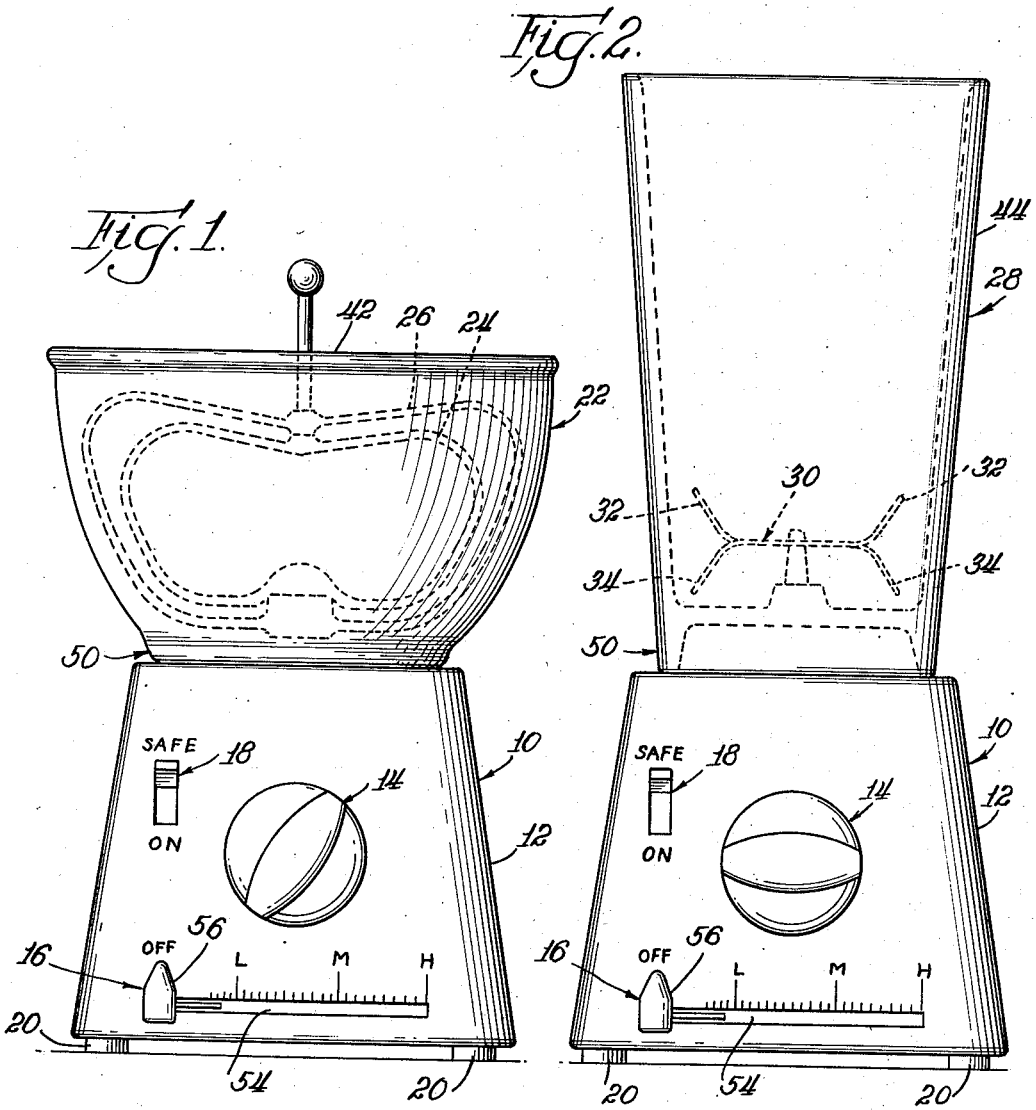
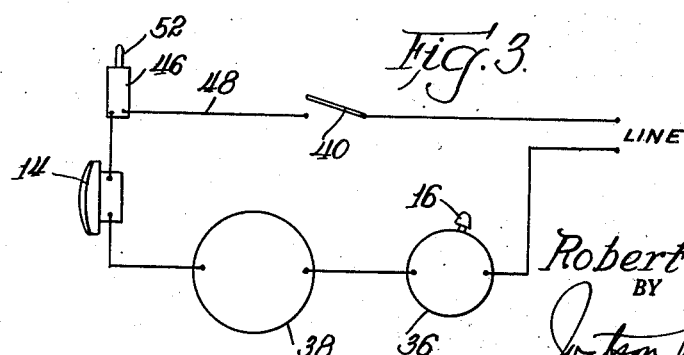
INVENTOR.
Robert C. Vaughan

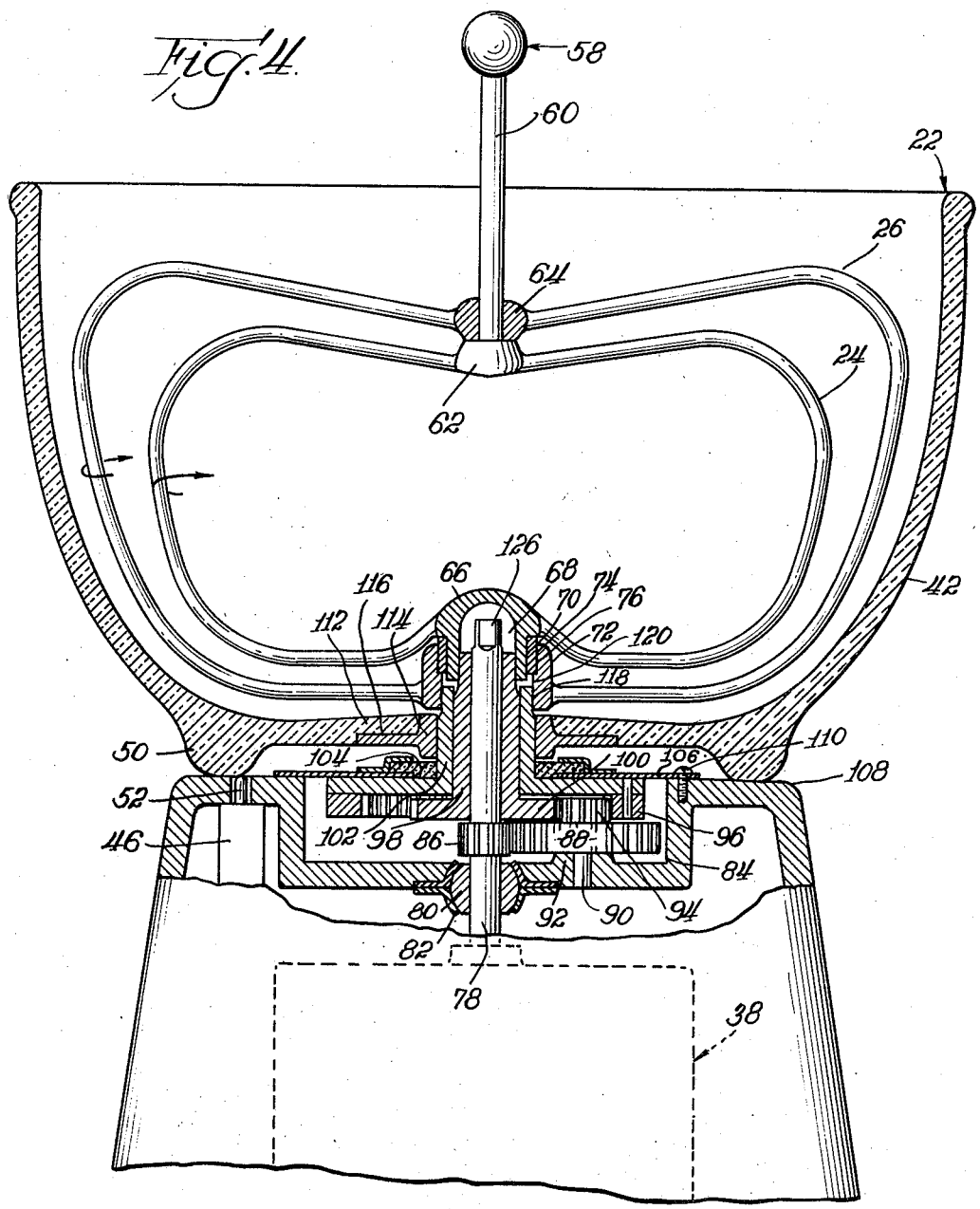

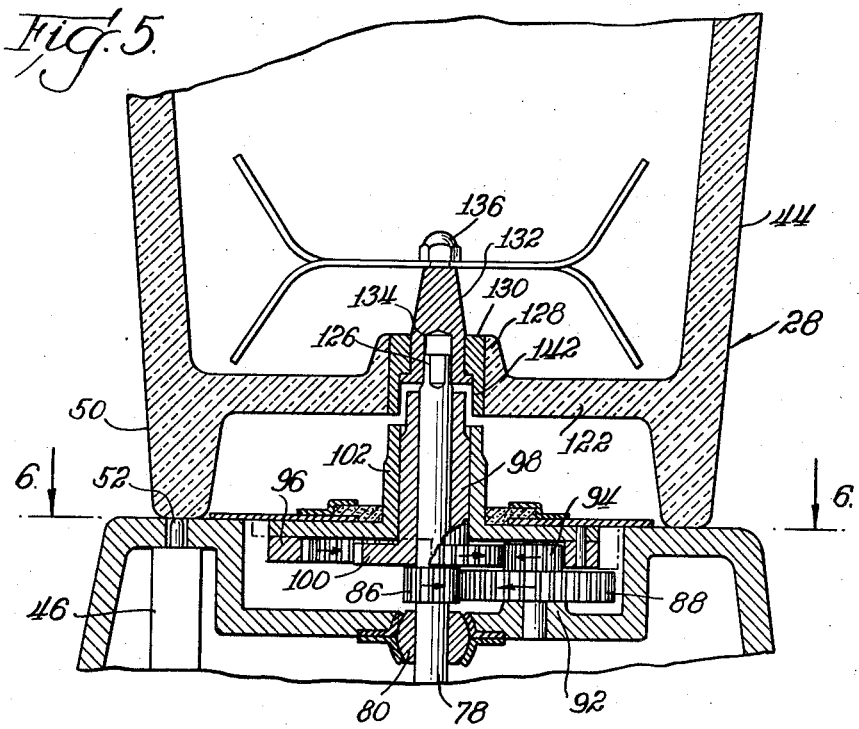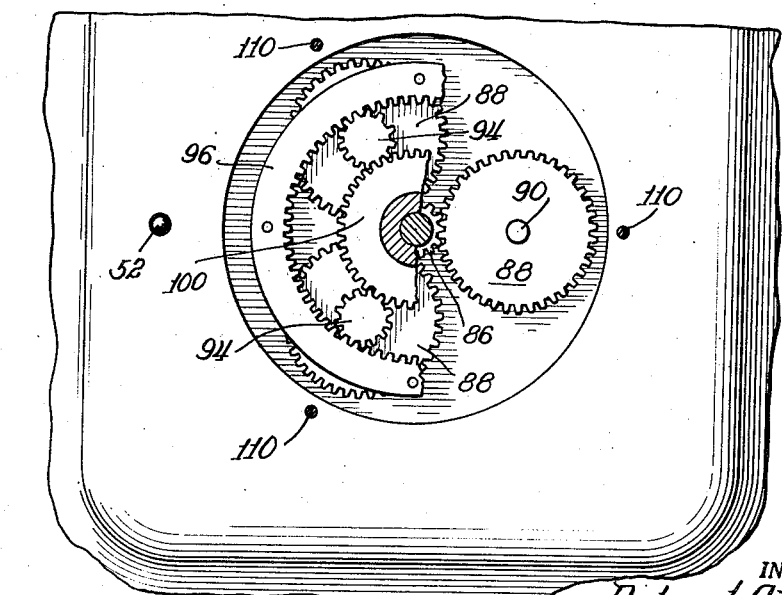

United States Patent Office 2,807,447
Patented Sept. 24, 1957

2,807,447

FOOD MIXER

Robert C. Vaughan, Chicago, Ill., assignor to Dormeyer Corporation, Chicago, Ill., a corporation of Illinois Application November 9, 1954, Serial No. 467,729

5 Claims. (Cl. 259—105)

This invention relates to a drive for blenders and mixers and more particularly to a drive adapted to rotate dual blades on a mixer in opposite directions at a relatively low speed and adapted to rotate a blender knife at a relatively high speed.

Heretofore, it has been necessary to provide two separate machines for blenders and mixers, respectively, because of the different speed requirements for the two operations. In addition, there has been lacking mechanism adapted to rotate the dual blades of a blender in opposite directions so that opposed currents will produce a thorough and speedy mixing which is not possible where a mass of material is being moved in one direction only.

Accordingly, it is an object of the present invention to provide a drive which is adapted for use with both blenders and mixers, and is also adapted for use with other standard appliances.

Another object of the invention is to provide a drive which is adapted to actuate a blender knife at speeds up to 18,000 revolutions per minute and also is adapted to actuate dual blades of a mixer thereof at speeds in the neighborhood of 1,000 revolutions per minute and in opposite directions.

Another object is to provide a drive mechanism of the type indicated which is actuated by a single drive shaft and which is of extremely compact form.

Another object of the invention is to provide a drive mechanism in which the operative shafts are in co-axial alignment and are journaled together for efficient operation.

Another object is to provide means whereby the respective drive shafts are adapted to key with a blender or with the dual blades of a mixer.

Yet another object is to provide a drive mechanism which affords an extremely simple and effective seal between the drive elements and the mixer or blender.

A further object is to provide a drive mechanism which is simple to manufacture and of sturdy construction and which affords substantial savings as compared with equipment heretofore required.

Other objects of the invention will become apparent from an examination of the drawings and the following description.

Referring now to the drawings,

Fig. 1 is a side elevational view of a base member containing the drive mechanism which is the subject of the present invention and a mixer in operative connection therewith;

Fig. 2 is a side elevational view of the base member in operative connection with a blender;

Fig. 3 is a diagrammatic representation of a circuit and motor adapted to actuate the drive mechanism which is the subject of the invention;

Fig. 4 is a vertical sectional view, partly broken away, of the drive mechanism and a mixer according to the present invention;

Fig. 5 is a vertical sectional view, partly broken away, of the drive mechanism and a blender according to the present invention; and Fig. 6 is a plan view, partly broken away, of a gear system for the drive mechanism of the present invention, taken along the line 6—6 of Fig. 5.

Referring now to Figs. 1 and 2, the drive mechanism 10 is provided with a housing 12 on which are mounted a timer 14, a speed regulator lever 16, and a safety switch 18. The housing 12 is also preferably provided with elastomer feet 20 adapted to reduce motor vibration and wearing of parts.

As seen in Fig. 1 the drive 10 may be operatively connected with a mixer 22 having individual blades 24 and 26 adapted to rotate in opposite directions with respect to one another. And, as seen in Fig. 2, the drive 10 alternatively may be operatively connected with a blender 28 having a unitary blade 30 provided with offset knife portions 32 and 34 at either end.

Fig. 3 discloses timer 14, a centrifugal governor 36, and motor 38 controlled by speed regulator lever 16 connected in series to the house line, while safety switch 18 is connected to a make-or-break 40 which is also disposed in series in the circuit.

It is desired to positively interrupt the circuit when the mixer bowl 42 or the blender container 44 is removed from the base 10 of the drive mechanism. This is accomplished by interposing a switch 46 in the lead 48 and by orienting the switch so that upon disposition of the containers and particularly the annular support bosses 50 formed on the bottom walls thereof, upon the base 12, the plunger 52 of the switch is depressed to close the circuit. On the other hand, when the container member is removed, the plunger 52 moves upwardly and the switch 46 breaks the circuit.

The speed regulator 16 permits the user of the mixer or blender to set the operating speed by selecting the desired speed from a range of possible speeds that are designated by appropriate indicia upon the housing 12. Thus the lever 16 extends through an elongated slot 54 in the side of the housing 12 and is equipped with a knob 56 which may have a suitable witness mark thereon to enable the knob to be moved readily into alignment with the selected speed from the speed indicia carried by the shell.

Referring now to Fig. 4 the drive mechanism 10 is seen in operative engagement with the mixer 22. When the drive is thus engaged it is adapted to actuate the inner blade 24 in one direction and the outer blade 26 in the opposite direction to insure that the materials to be mixed do not circulate in one direction only but that cross currents will be provided to effect a complete intermingling of the materials to be mixed.

A handle 58 having a shaft 60 is preferably fixedly secured to the inner blade 24 while blade 26 is journaled on the shaft 60 so that the upper surface of the hub 62 connecting the upper ends of the blade 24 serves as a bearing for the hub 64 joining the ends of blade 26. Inner blade 24 is also preferably provided with a lower hub 66 having an interior coaxial bore 68 opening downwardly and having an annular inset portion 70 while outer blade 26 is provided with a collar 72 having a complementary inset portion 74 adapted to rotatably seat a bearing 76. Accordingly, blades 24 and 26 are adapted for mutual opposite rotation and may be easily removed as a unit, for cleaning purposes, by means of the handle.

The motor 38 has rotatably secured thereto a drive shaft 78 journaled in the self-aligning bearing or bushing 80 mounted in a double flanged annular support bearing 82 in the central receptacle 84 in base 10. Drive shaft 78 has fixedly secured thereto, a gear 86 adapted to engage planetary gears 88, the said planetary gears being maintained against displacement by the studs 90 which are preferably journaled in the bosses 92 on the floor of the receptacle. The studs 90 also have fixedly secured thereto pinions 94, of substantially the same diameter as sun gear 86, and of substantially reduced diameter as compared with planetary gears 88. The pinions 94 engage a ring gear 96 to rotate the same in a direction opposite to the direction of rotation of drive shaft 78 but at a greatly reduced speed with respect thereto. Journaled to drive shaft 78 in coaxial alignment therewith is a hollow shaft 98 having integrally formed thereon at its lower end a sun gear 100 adapted to engage pinions 94 to rotate them in a direction opposite to the direction of rotation of the ring gear 96 and at a speed substantially the same as that of the ring gear. A shaft 102 is similarly journaled coaxially on shaft 98 for opposite rotation thereto and is fixedly secured to the ring gear 96, as pinion 100 is similarly secured to shaft 98. Shaft 102 is sealed within the receptacle 84 by means of a bushing 104 maintained on a cover plate 106 which is secured to the upper face 108 on base 12 by means of screws 110.

Shaft 78 is actuated by motor 38 to rotate at speeds of up to 18,000 revolutions per minute while the above described gear train reduces the rates of rotation of shafts 98 and 102 to substantially 1,000 revolutions per minute when the shaft is revolving at 18,000 revolutions per minute. Since shaft 98 rotates in the same direction as shaft 78, there will be no appreciable drag exerted by shaft 98 upon shaft 78. At the same time the relatively reduced rates of rotation given shafts 98 and 102 insure that the frictional resistance between the oppositely rotating shafts thus journaled together will also be held to a minimum.

The connection between the drive mechanism 10 and the mixer 24 provides an extremely effective sealing means. Thus the bottom of the mixing bowl 112 is preferably provided with a bushing 114 secured to an inset portion 116 of the wall 112 and adapted to receive therethrough in sealing relationship the shaft 102 and shafts 98 and 78 journaled therein. Since the shafts 98 and 78 are disposed internally of shaft 102 in snugly abutting relationship with each other and with shaft 102, no separate sealing means are required for these members. Shaft 102 is provided with a configured upper end portion 118 adapted to enter in complementary locking engagement with the bore 120 of hub 72 on blade 26. At the same time the upper portion of the shaft 98 is given a similar locking configuration to engage the inner lower surface of the collar 66 whereby to actuate the inner blade 24 in opposite direction to the blade 26, both blades being adapted to rotate at substantially 1,000 revolutions per minute as stated.

It will be seen that bore 68 is relatively enlarged with respect to the keyed upper portion 126 of the shaft 78 whereby to maintain the shaft for free rotation with respect to the blade 24, so that slow and steady but thorough mixing action may be effected by the previously mentioned opposite rotation of the blades 24 and 26.

In operation, therefore, mixing bowl 42 is seated on the base 12 by means of the annular boss 50 so that the shaft 102 is inserted through bushing 114 is sealed relation therewith. Thereupon, the blades 24 and 26 are keyed to shafts 102 and 98, respectively, by means of handle 58 whereby the blades are maintained in appropriate spaced relation to the mixer bowl 42. When the annular boss 50 is mounted on the base 12, the plunger 52 is depressed to connect the circuit and upon setting of the speed regulator lever 16 the shaft 78 will be rotated at desired speeds up to 18,000 revolutions per minute. When the timer 14 is set the mixer may be left alone until the mixing process is completed.

Referring now to Fig. 5, the blender 28 is provided with an annular boss or collar 128 which rotatably receives therein a bearing 130. The bearing 130 is rigidly secured to a coupling providing a shaft portion 132 that has a square recess 134 therein to engage in keying relationship the upper substantially square end portion 126 of the shaft 102. The upper end of the shaft 132 is threaded and a nut 136 rigidly and tightly secures a knife 30 having a plurality of blades or cutters upon the shaft 132 and bearing 130. A sealing means is also preferably provided so that the contents of the container 44 do not flow downwardly through the collar or boss 128. When the blender 28 is thus disposed on the base 12 the shaft 78 is adapted to rotate the blender knife at speeds of up to 18,000 revolutions per minute. However, a relatively wide sleeve portion 142 in the bearing 130 insures that the upper portion of the shaft 98, which preferably penetrates the boss 128, is maintained in spaced relation thereto while the shaft 102, which extends upwardly a relatively lesser distance with respect to the shaft 98, is in subjacent spaced relationship to the bottom wall 122 of the container 44.

The annular boss 50 on the blender 28 actuates the safety mechanism as above described, and the speed and timing mechanisms are substantially the same in operation as described with respect to the mixer. However, when the blender 28 and shaft 132 thereof are set in keyed relationship with the shaft 78 as described, a one-directional high speed blending action is achieved without regard to the reduced speeds of the shafts 98 and 102 which are journaled around the shaft 78.

Accordingly, the same mechanism is adapted to actuate both blenders and mixers whereby to effect substantial economies in the cost of equipment. At the same time, the shafts cannot easily get out of alignment and afford a very effective sealed connection between the drive and the respective blades.

The shaft 98 also provides a desirable bearing for inner shaft 78 since the shaft 98 not only maintains the shaft 78 against vibration but, by rotating in the same direction cuts down on wear and on the amount of lubrication normally necessary in the usual sleeve bearing of a similar type. At the same time the relatively reduced speeds of the shafts 98 and 102 insure that excessive friction will not develop between these drive elements. The shaft 98 will be maintained against vibration and maintained in proper alignment both by the central shaft 78 and the outer shaft 102.

Vibration in the containers is substantially reduced by provision of the sealing means therein, while vibration in the base member 12 is controlled by means of the self-aligning bearing 82 in the receptacle portion of the base. The extremely compact and simple construction of the coaxial drive mechanism affords substantial economies in manufacture, and makes mixing and blending equipment available at a fraction of the cost heretofore required.

Although but one specific embodiment of this invention has been herein shown and described it will be understood that details of the particular construction shown may be altered or omitted without departing from the spirit of the invention as defined by the following claims.

What is claimed is:

1. In a food mixer the combination of a motor housing, a motor drive shaft journalled on spaced bearings in said motor housing and having one end exposed beyond one of the bearings and a gear spaced therefrom, drive means on said exposed end for selectively transmitting torque, a sleeve journalled in snugly abutting coaxial relationship with said drive shaft and having a second gear thereon of greater diameter than the first gear, a second sleeve journalled in snugly abutting coaxial relationship with said first sleeve and having a third gear thereon of a diameter greater than said first gear, and a speed reducing and direction reversing transmission means between said second and third gear including a fourth gear of large diameter relative to said first gear and meshing with said first gear and a smaller spur gear driven by said fourth gear meshing with said second and third gears, food mixing elements including a bowl and beater blades disposed in the bowl near the side of the bowl, one of said elements covering said exposed end and engaging the first sleeve in rotary driven relationship in one direction and another of said elements engaging said second sleeve in rotary driven relationship for rotation in a direction opposite to that of said one of said elements.

2. In a food mixer the combination of a motor housing, a motor drive shaft journalled on spaced bearings in said motor housing and having one end exposed beyond one of the bearings and a gear spaced therefrom, drive means on said exposed end for selectively transmitting torque, a sleeve journalled in snugly abutting coaxial relationship with said drive shaft and having a second gear thereon, a second sleeve journalled in snugly abutting coaxial relationship with the first sleeve and having a third gear thereon of a diameter greater than said first gear, and a speed reducing and direction reversing transmission means between said second and third gear including a fourth gear of large diameter relative to said first gear meshing with said first gear and a spur gear relatively smaller than said fourth gear and driven by said fourth gear driving said third gear, food mixing elements including a bowl having a central opening in the bottom and beater blades disposed in the bowl near the side of the bowl, one of said elements engaging said first sleeve in rotary driven relationship in one direction and another of said elements engaging said second sleeve in rotary driven relationship for rotation in a direction opposite to that of said one of said elements.

3. In a food mixer having a motor driven power unit, the combination of a housing, a motor driven shaft journalled on spaced bearings in said housing and having one exposed end and a gear spaced therefrom, drive means on said exposed end for selectively transmitting torque, a sleeve journalled in snugly abutting coaxial relationship with said driven shaft and having a second gear thereon coaxial with the first gear, a speed reducing and direction reversing transmission means between said first and second gears including a third gear of large diameter relative to said first gear and driven from said first gear and a spur gear relatively smaller than said third gear and driven by said third gear and driving said second gear, food mixing elements including a bowl having a central opening in its bottom received over said sleeve and beater blades disposed in the bowl near the side of the bowl, one of said elements being driven from said first gear in rotary driven relationship in one direction and another of said elements engaging said sleeve in rotary driven relationship for rotation in a direction opposite to that of said one of said elements.

4. In an electric food mixer having a motor powered unit the combination of a housing base, a motor driven shaft journalled on bearings in said base, a gear on said driven shaft, a shaft journalled in snugly abutting coaxial relationship with said driven shaft and having a second gear thereon and an exposed end for selectively transmitting torque, a sleeve journalled in snugly abutting coaxial relationship with said shafts and having a third gear thereon, a speed reducing and direction reversing transmission between the first and third gears including a fourth gear of large diameter relative to said first gear and meshing with said first gear and a spur gear fixed on said fourth gear meshing with said third gear, said spur gear approximating the dimensions of said first gear, the second shaft and said sleeve extending above said housing, food mixing elements including a bowl having an opening through its bottom received over said second shaft and sleeve to be supported above said base and beater blades disposed in the bowl near the side thereof, one of said elements engaging the second shaft for rotary driven relationship in one direction and another of said elements engaging said sleeve in rotary driven relationship for rotation in a direction opposite to that of said one of said elements.

5. In an electric food mixer having a motor powered unit the combination of a housing, motor drive and driven shafts journalled on bearings in said housing, a gear on said drive shaft and a gear upon said driven shaft, drive means on the driven shaft for selectively transmitting torque, a sleeve shaft journalled coaxially with said drive and driven shafts and having a third gear thereon, a speed reducing and direction reversing transmission between the first and third gears including a fourth gear of large diameter relative to said first gear and meshing with said first gear and a spur gear fixed on said fourth gear meshing with said third gear, said spur gear being smaller than said fourth gear and slightly larger than said first gear, food mixing elements including a bowl having an opening through its bottom received over said driven and sleeve shafts and beater blades disposed in the bowl near the side thereof, one of said elements engaging one of the shafts for rotary driven relationship in one direction and another of said elements engaging the sleeve shaft in rotary driven relationship for rotation in a direction opposite to that of said one of said elements.

References Cited in the file of this patent

UNITED STATES PATENTS

| 799,261 | Pratts | Sept. 12, 1905 |
| 1,823,314 | Brewer | Sept. 15, 1931 |
| 1,921,893 | Steele | Aug. 8, 1933 |
| 2,109,501 | Osius | Mar. 1, 1938 |
| 2,552,023 | Andersen | May 8, 1951 |
| 2,671,191 | Braski | Mar. 2, 1954 |

FOREIGN PATENTS

| 920,061 | France | Dec. 16, 1946 |